Sept. 22, 1953      F. L. McMILLAN, JR      2,653,294

APPARATUS FOR ELECTRICAL WELL LOGGING

Filed April 21, 1949      2 Sheets-Sheet 1

INVENTOR.
FRED L. McMILLAN, Jr.
BY Hudson & Young
by: L. Malcolm Oberlin
ATTORNEYS INVENTOR.
FRED L. McMILLAN, Jr.

Patented Sept. 22, 1953

2,653,294

UNITED STATES PATENT OFFICE 2,653,294

APPARATUS FOR ELECTRICAL WELL LOGGING

Fred L. McMillan, Jr., Bartlesville, Okla., assignor to Phillips Petroleum Company, a corporation of Delaware Application April 21, 1949, Serial No. 88,787

11 Claims. (Cl. 324—10)

This invention relates to apparatus for electrical well logging. In another aspect, it relates to a tool embodying a plurality of spaced electrodes for use in making potential surveys of wells.

In electrical well logging, it is common practice to submerge an electrode in a liquid-containing well, an electrical potential being established between this electrode and ground. A measurement is then taken of the potential of a second electrode with respect to ground, this measurement providing valuable information regarding the physical structure of the strata adjacent the well. This is referred to as a two-electrode log. In some cases, the potential of the second electrode with respect to ground is measured without application of current to another electrode in the well to determine the "spontaneous" potential of the second electrode. A still further electrical logging system involves measurement of the potential difference between two electrodes while applying a potential between a third electrode and ground, this being referred to as a three-electrode log.

It is an object of my invention to provide well logging apparatus with which it is possible to obtain more varied information than was the case with previous electrical logging devices.

It is a further object of the invention to provide a tool embodying a plurality of spaced electrodes for making electrical well surveys.

It is a still further object to provide apparatus which is simple in construction, rugged, durable, and economical to manufacture.

Various other objects, advantages and features of the invention will become apparent from the following detailed description taken in conjunction with the accompanying drawings, in which.

Figure 1:
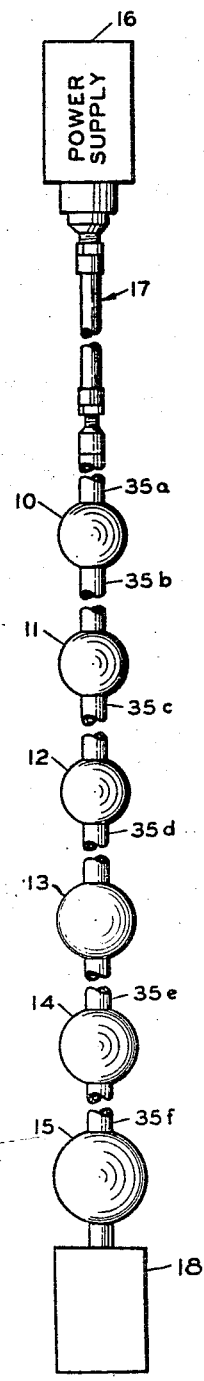
Figure 1 is a front elevational view of the electrode-carrying tool.

Referring now to the drawings in detail, and particularly to Figure 1, I have shown a tool carrying a series of spaced metal electrodes 10, 11, 12, 13, and 14, the electrodes 13, 14 being of somewhat greater diameter than the other electrodes. The tool also carries a ball 15 which acts as a guide and may be formed from rubber. The ball 15 is preferably of greater diameter than the electrodes 13 and 14. The electrodes are secured to a power supply unit 16 by a support assembly 17 and the ball 15 is adapted to have a weight 18 suspended therefrom in the manner hereinafter explained, so that the tool assumes a vertical position in the well. The power supply unit 16 carries a plurality of alternating current generators of different frequencies together with a motor for operating the same, and a battery for supply direct current to the motor. Alternatively, the battery may be located at the surface and the motor current may be supplied by leads extending from the tool to the surface through a suitable supporting cable.

A fitting 19 is received within a suitable passage formed at the lower end of the unit 16 and the upper end of this fitting is provided with a flanged portion 20 which is forced into engagement with a sealing gasket 21 by a nut 22, this nut being received in a threaded portion 23 of the unit 16. The nut 22 carries a plurality of feed through insulators, two of which are indicated at 24 and 25, these insulators being adapted for connection at first ends thereof to leads, not shown, extending to the electrode structure and, at the other ends thereof, to leads extending to the surface through a supporting cable. The lower end of the fitting 19 is threaded to receive a nipple 27 which carries a pipe 28 formed from rigid insulating material. The lower end of pipe 28 is received within a nipple 29 which is threaded into a fitting 30, the lower end of the nipple abutting a washer 31 seated in a recessed part of the fitting 30. The lower end of fitting 30 is threaded to receive the upper section 32a of an elongated tubular support 32 which is formed of sections 32a to 32f. Support 32a abuts a washer 33 seated in a suitable recessed part of the fitting 30. The tubular support 32a is preferably a metal pipe which together with generally similar supports or pipes 32b to 32f, inclusive, form rigid supports for a plurality of sleeves 35a to 35f, inclusive, which are bonded together and are mounted concentrically therewith, the upper end of sleeve 35a abutting the fitting 30.

Figure 2:
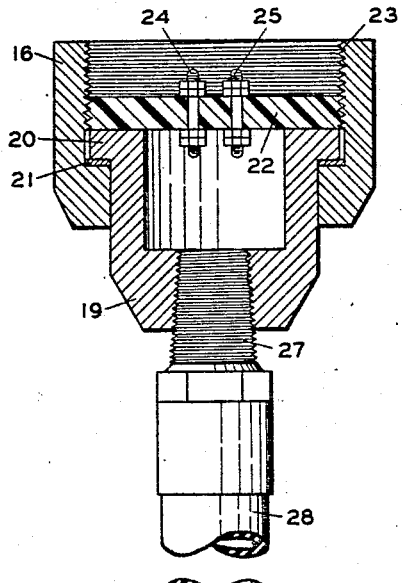
Figure 2 is an enlarged vertical sectional view, partially in elevation, of the top portion of the tool.
Figure 3:
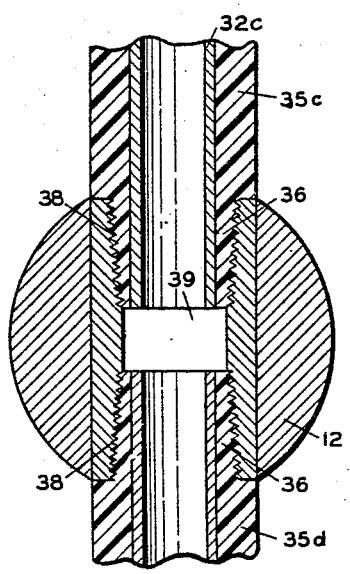
Figure 3 is an enlarged vertical sectional view of one of the electrode assemblies.
Figure 4:
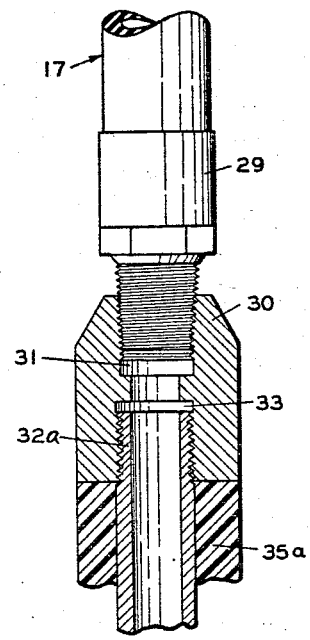
Figure 4 is a vertical sectional view of the lower electrode and weight assembly.

Each of the sleeves 35a to 35f, inclusive, is provided with tapered threaded end portions 36, and each of the electrodes 10 to 14, inclusive, has a central passage formed therein of greater diameter than the tubular support 32, the respective ends of each passage being tapered and threaded, as indicated at 38, in complementary fashion with the threaded portions 36 of the two adjacent sleeves. An opening 39 is formed within each of the electrodes 10 to 14, inclusive, by the termination of sleeves 35 and supports 32 short of the center of the electrode so that a lead may be connected to each electrode, these leads extending upwardly through the tubular support 32 to the feed through insulators 24 and 25, Figure 2. The lower end of sleeve 35a is provided with a tapered threaded end portion not shown, which cooperates with a threaded passage, not shown, in the electrode 10 in the manner just described.

The ball 15 is threaded to a metal fitting 40 which is provided with a tapered threaded portion 41 cooperating with the threads 36 at the lower end of sleeve 35f. The lower end of tubular support 32f is threaded to receive a plug 42 provided with a feed through insulator 43 to permit a lead to extend from the interior of tubular support 32 through the feed through insulator for connection to the fitting 40 in ball 15, this plug sealing the lower end of the tubular support 32f. A threaded passage 44 is formed in the lower end of fitting 40 and an opening 45 is formed in the ball 15, this opening registering with the threaded passage 44. In this fashion, the lower electrode assembly is adapted to receive a weight 18 which has a threaded portion extending through the opening 45 to engage passage 44.

It will be apparent that I have provided a simple and compact assembly for supporting a plurality of electrodes in a well. The sleeves 35 effectively insulate the electrodes from the metal support 32 which furnishes mechanical rigidity for the structure. These sleeves also assure that the electrodes are maintained in proper spaced relation, and the construction is such that no sealing problems are encountered even while providing for a weight to be properly secured to the tool to maintain it in a vertical position within the well. It is further apparent that any desired number of electrodes may be used and that the assembly is very flexible as regards the number and spacing of the electrodes which may be varied, as desired, simply by changing the number and length of the sleeves 35.

Figure 5:
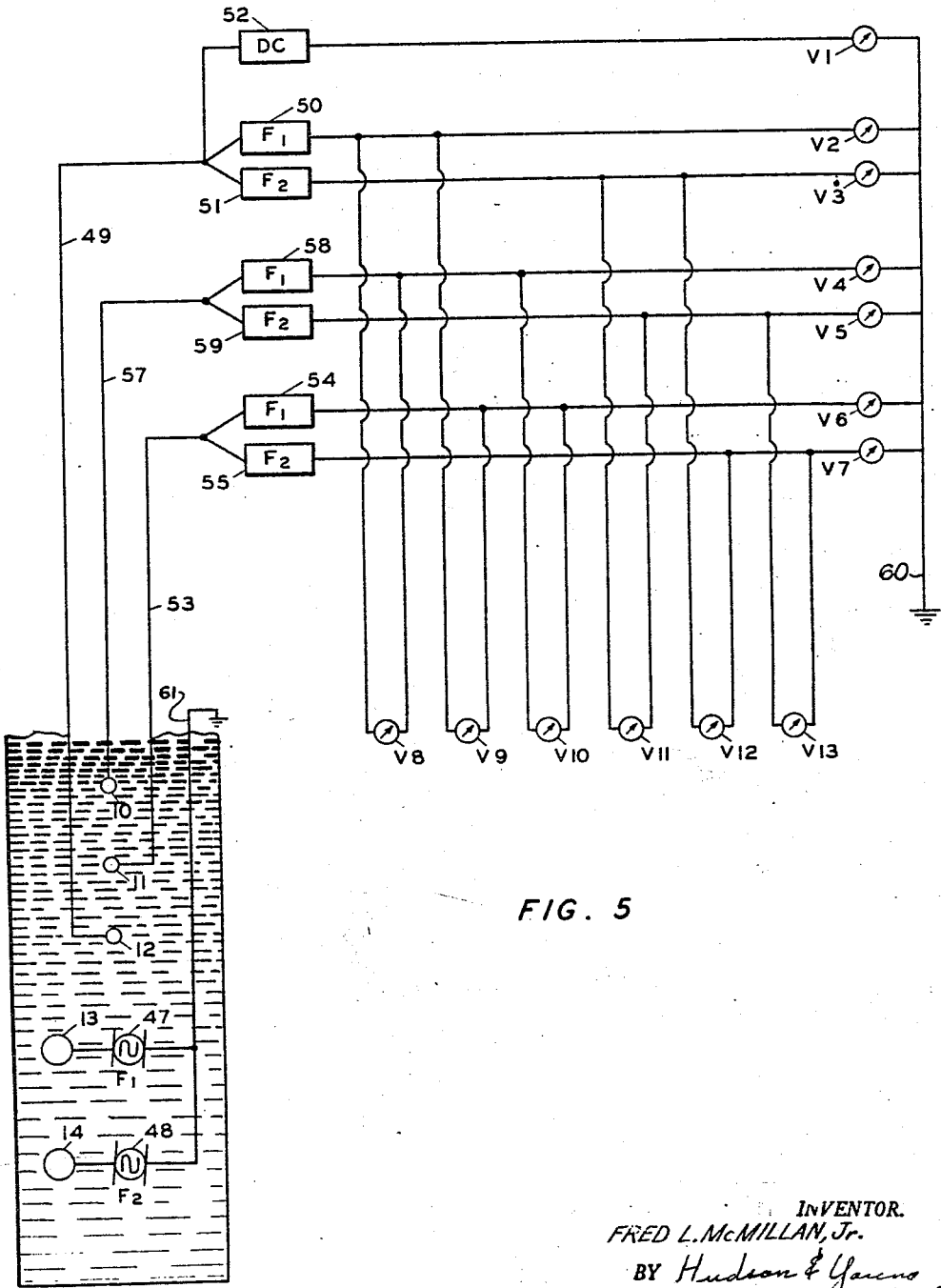
Figure 5 is a schematic circuit diagram of the well logging apparatus.

A circuit for utilizing the described tool is shown in Figure 5 in which I have described a system utilizing five electrodes although it will be understood that more or less may be used. It will be noted that a generator 47 impresses an alternating current frequency of F-1 between electrode 13 and ground while a generator 48 impresses a current of frequency of F-2 between electrode 14 and ground. The common ground employed herein can be at the casing of power supply unit 16 which is positioned above electrode 10 and, said ground being connected to generators 47 and 48 by lead 61. Electrode 12 is connected by a lead 49 to a unit comprising a band pass filter 50 for passing frequency F-1, a filter 51 for passing frequency F-2 and a filter 52 for passing direct current. Similarly, electrode 11 is connected by a lead 53 to a unit including a filter 54 for passing current of frequency F-1, and a filter 55 for passing current of frequency F-2. Finally, electrode 10 is connected by a conductor 57 to a filter 58 for passing a current of frequency F-1, and a filter 59 for passing current of frequency F-2. Voltmeters V-1 to V-7, inclusive, are connected between the outputs of the respective filters 52, 50, 51, 58, 59, 54 and 55 and the grounded conductor 60. A voltmeter V-8 is connected across the output circuits of filters 50 and 58, a voltmeter V-9 is connected across the output circuits of filters 50 and 54, and a voltmeter V-10 is connected across the output circuits of filters 54 and 58. A voltmeter V-11 is connected across the output circuits of filters 51 and 59, a voltmeter V-12 is connected across the output circuits of voltmeters 51 and 55, and a voltmeter V-13 is connected across the output circuits of filters 55 and 59. The voltmeters V-1 to V-7, inclusive, should be of substantially lower resistance than the voltmeters V-8 to V-13, inclusive, so that current drawn by the latter set of voltmeters will not appreciably affect the readings of the former set of voltmeters. In some cases, it is desirable that the meters V-1 to V-13, inclusive, be replaced by vacuum tube voltmeters or, alternatively, they may be replaced by the input circuits of a recording device, such as that shown in the copending application of Raymond G. Piety and Fred L. McMillan, Jr., Serial No. 117,338, filed September 23, 1949, entitled Pulse Measuring Apparatus.

In the operation of thet circuit, voltmeter V-1 indicates the direct current flow between electrode 12 and ground which is an indication of the spontaneous potential at electrode 12. Ordinarily, as shown, only one spontaneous potential need be measured and any of the three electrodes 10, 11 or 12 may be chosen for this purpose. The voltmeters V-2, V-4 and V-6 indicate, respectively, the potentials of electrodes 12, 10 and 11 with respect to ground, at frequency F-1. It will be understood that current of frequency F-1 flows between electrode 13 and each of the electrodes 10, 11 and 12, and that each of these electrodes ordinarily has a different potential, measured at frequency F-1, with respect to ground due to the flow of this current. Thus, each of the voltmeters V-2, V-4 and V-6 provides the information normally produced by a two-electrode log. Voltmeters V-3, V-5 and V-7 measure the potentials of the respective electrodes 12, 10 and 11 relative to ground with reference to frequency F-2. Thus, these three voltmeters provide the information normally produced by taking two-electrode logs between electrode 14 and each of the electrodes 10, 11 and 12. Voltmeter V-8 measures the potential difference between electrodes 10 and 12 at frequency F-1, voltmeter V-9 measures the potential difference between electrodes 11 and 12 at frequency F-1, and voltmeter V-10 measures the potential difference between electrodes 10, 11 at frequency F-1. These voltmeters provide the same information as would be given by three three-electrode logs in the bore hole, each such log involving the use of electrode 13 and two of the electrodes 10, 11 and 12. In similar fashion, voltmeter V-11 indicates the potential difference between electrodes 10, 12 at frequency F-2, voltmeter V-12 indicates the potential difference between the electrodes 11, 12 at frequency F-2, and voltmeter V-13 indicates the potential difference between the electrodes 10, 11 at frequency F-2. Accordingly, these latter voltmeters provide the same information as that given by three three-electrode logs, each involving the use of electrode 14 and two of the electrodes 10, 11 and 12. It will be apparent that the present syestem enables a multiplicity of potentials to be measured simultaneously. Due to the use of filter circuits, there is no interference between the several potentials to be measured so that no sacrific in accuracy is involved by providing the simultaneous readings. The system is very flexible in operation and is adapted for many purposes heretofore unrealized in the art of electric logging since various types of information may be obtained when the tool is positioned at a predetermined bore hole location.

While the invention has been described in connection with a present, preferred embodiment thereof, it is to be understood that this description is illustrative only and is not intended to limit the invention, the scope of which is defined by the appended claims.

Having described my invention, I claim:

1. An electrode structure for electric well logging which comprises, in combination, an elongated tubular support, a plurality of sleeves of insulating material spaced along said tubular support and mounted concentrically therewith, each of said sleeves having a tapered threaded portion at each end thereof, and an electrode disposed between each pair of sleeves, each electrode having a central passage formed therein of greater diameter than said tubular support, tapered threaded portions being formed at the respective ends of said passage which are complementary with the tapered threaded portions of the two adjacent sleeves.

2. An electrode structure for electric well logging which comprises, in combination, an elongated tubular support, a plurality of sleeves of insulating material spaced along said tubular support and mounted concentrically therewith, each sleeve having a tapered threaded portion at each end thereof, and an electrode disposed between each pair of sleeves, each electrode having a central passage formed therein of greater diameter than said tubular support, a tapered threaded portion being formed at each end of said passage which is complementary with one of the tapered portions of the two adjacent sleeves, a weight assembly secured to one end of said support, a casing secured to the other end of said support, said casing containing at least one alternating current generator, leads extending through said pipe connecting said generator to one of said electrodes, and a lead connected to each of said other electrodes extending through said tubular support into said casing.

3. An electrode structure for electric well logging which comprises, in combination, an elongated rigid tubular support having a plurality of longitudinally spaced openings therein, a plurality of sleeves of insulating material spaced along said tubular support and mounted concentrically therewith, each sleeve having a tapered threaded portion at each end thereof, and an electrode disposed between each pair of sleeves, each electrode having a central passage formed therein of greater diameter than said tubular support, a tapered threaded portion being formed at each end of said passage which is complementary with one of the tapered portions of the two adjacent sleeves, a weight assembly secured to one end of said support, a casing secured to the other end of said support, said casing containing at least one alternating current generator, leads extending through said support and one of said openings, connecting said generator to one of said electrodes, and a lead connected to each of said other electrodes extending through said supoprt and another of said openings into said casing.

4. An electrode structure for electric well logging which comprises, in combination, an elongated rigid tubular support having a plurality of longitudinally spaced openings therein, a plurality of sleeves of insulating material spaced along said tubular support and mounted concentrically therewith, each sleeve having a tapered threaded portion at each end thereof, and an electrode disposed between each pair of sleeves, each electrode having a central passage formed therein of greater diameter than said tubular support, a tapered threaded portion being formed at each end of said passage which is complementary with one of the tapered portions of the two adjacent sleeves, a weight assembly secured to one end of said support, said assembly including a tube screw threaded to the lower end of the lower sleeve, a ball shaped member secured to said tube, said tube having a threaded opening at its lower end, and said ball having a vertical passage therein registering with said threaded opening, a casing secured to the other end of said support, said casing containing at least two alternating current generators, leads extending through said support and two of said openings connecting said generator to two of said electrodes, and a lead connected to each of said other electrodes extending through said support and another of said openings into said casing.

5. Apparatus for electrical well logging comprising, in combination, a unit carrying a series of spaced electrodes adapted to be lowered into a bore hole, an alternating current generator having one terminal thereof grounded and another terminal thereof connected to one of said electrodes, leads connecting a plurality of other electrodes to the surface, a circuit for individually measuring the potential of each of said other electrodes with respect to ground, and a circuit for measuring the potential difference between selected pairs of said other electrodes.

6. Apparatus for electrical logging comprising, in combination, a tool adapted to be lowered into a bore hole including a series of spaced electrodes, an alternating current generator of a first frequency connected between one of said electrodes and ground, an alternating current generator of a second frequency connected between another of said electrodes and ground, leads connecting a plurality of other electrodes with surface apparatus, said surface apparatus including a circuit for individually measuring the alternating current potential of each of said other electrodes with respect to ground at said first frequency, a circuit for individually measuring the alternating current potential of each of said other electrodes with respect to ground at said second frequency, and a circuit for measuring the alternating current potential difference between selected pairs of said other electrodes at each of said two frequencies.

7. An electrode structure for electric well logging which comprises, in combination, an elongated tubular support, a plurality of sleeves of insulating material spaced along said tubular support and mounted concentrically therewith, each of said sleeves having a threaded portion at each end thereof, and an electrode disposed between each pair of sleeves, each electrode having a central passage formed therein of greater diameter than said tubular support, threaded portions being formed at the respective ends of said passage which are complementary with the threaded portions of the two adjacent sleeves.

8. An electrode structure for electric well logging which comprises, in combination, an elongated rigid tubular support having a plurality of longitudinally spaced openings therein, a plurality of sleeves of insulating material spaced along said tubular support and mounted concentrically therewith, each sleeve having a threaded portion at each end thereof, and an electrode disposed between each pair of sleeves, each electrode having a central passage formed therein of greater diameter than said tubular support, a threaded portion being formed at each end of said passage which is complementary with one of the threaded portions of the two adjacent sleeves, a weight assembly secured to one end of said support, a casing secured to the other end of said support, said casing containing at least one alternating current generator, leads extending through said support and one of said openings, connecting said generator to one of said electrodes, and a lead connected to each of said other electrodes extending through said support and another of said openings into said casing.

9. Well logging apparatus comprising, in combination, a unit adapted to be lowered into a bore hole, said unit including an elongated tubular support, a plurality of sleeves of insulating material spaced along said tubular support and mounted concentrically therewith, each of said sleeves having a threaded portion at each end thereof, and an electrode disposed between each pair of sleeves, each electrode having a central passage formed therein of greater diameter than said tubular support, threaded portions being formed at the respective ends of said passage which are complementary with the threaded portions of the two adjacent sleeves; an alternating current generator having one terminal grounded and another terminal thereof connected to one of said electrodes, leads connecting a plurality of other electrodes to the surface, a circuit for individually measuring the potential of each of said other electrodes with respect to ground, and a circuit for measuring the potential difference between selected pairs of said other electrodes.

10. Well logging apparatus comprising, in combination, a unit adapted to be lowered into a bore hole, said unit including an elongated rigid tubular support having a plurality of longitudinally spaced openings therein, a plurality of sleeves of insulating material spaced along said tubular support and mounted concentrically therewith, each sleeve having a threaded portion at each end thereof, and an electrode disposed between each pair of sleeves, each electrode having a central passage formed therein of greater diameter than said tubular support, a threaded portion being formed at each end of said passage which is complementary with one of the threaded portions of the two adjacent sleeves, a weight assembly secured to one end of said support, a casing secured to the other end of said support, said casing containing an alternating current generator of a first frequency connected between one of said electrodes and ground, and an alternating current generator of a second frequency connected between another of said electrodes and ground; leads connecting a plurality of other electrodes with surface apparatus, said surface apparatus including a circuit for individually measuring the alternating current potential of each of said other electrodes with respect to ground at said first frequency, a circuit for individually measuring the alternating current potential of each of said other electrodes with respect to ground at said second frequency, and a circuit for measuring the alternating current potential difference between selected pairs of said other electrodes at each of said two frequencies.

11. Well logging apparatus comprising, in combination, a unit adapted to be lowered into a bore hole, said unit including an elongated rigid tubular support having a plurality of longitudinally spaced openings therein, a plurality of sleeves of insulating material spaced along said tubular support and mounted concentrically therewith, each sleeve having a tapered threaded portion at each end thereof, and an electrode disposed between each pair of sleeves, each electrode having a central passage formed therein of greater diameter than said tubular support, a tapered threaded portion being formed at each end of said passage which is complementary with one of the tapered portion of the two adjacent sleeves, a weight assembly secured to one end of said support, said assembly including a tube screw threaded to the lower end of the lower sleeve, a ball shaped member secured to said tube, said tube having a threaded opening at its lower end, and said ball having a vertical passage therein registering with said threaded opening, a casing secured to the other end of said support, said casing containing an alternating current generator of a first frequency connected between one of said electrodes and ground, and an alternating current generator of a second frequency connected between another of said electrodes and ground; leads connecting a plurality of other electrodes with surface apparatus, said surface apparatus including a plurality of filter circuits for individually measuring the alternating current potential of each of said other electrodes with respect to ground at said first frequency, a plurality of filter circuit for individually measuring the alternating current potential of each of said other electrodes with respect to ground, at said second frequency, means for connecting said filter circuits so as to measure the alternating current potential difference between preselected pairs of said other electrodes at each of said two frequencies, and a circuit for measuring the direct current potential of one of said other electrodes with respect to ground.

FRED L. McMILLAN, Jr.

References Cited in the file of this patent

UNITED STATES PATENTS

| Number | Name | Date |
|---|---|---|
| 396,176 | Simpson | Jan. 15, 1889 |
| 1,254,927 | Neckerman | Jan. 29, 1918 |
| 1,859,311 | McEvoy | May 24, 1932 |
| 2,174,638 | Schlumberger | Oct. 3, 1939 |
| 2,307,887 | Haynes | Jan. 12, 1943 |
| 2,317,259 | Doll | Apr. 20, 1943 |
| 2,357,178 | Doll | Aug. 29, 1944 |
| 2,390,409 | Aiken | Dec. 4, 1945 |
| 2,393,009 | Chun | Jan. 15, 1946 |
| 2,404,622 | Doan | July 23, 1946 |
| 2,459,196 | Stewart | Jan. 18, 1949 |